United States Patent [19]

Bremmer

[11] 4,286,982

[45] Sep. 1, 1981

[54] PROCESS OF MANUFACTURING STABLE AMMONIUM POLYPHOSPHATE FERTILIZERS

[76] Inventor: James S. Bremmer, R.R.#3, Box 561, O'Fallon, Mo. 63366

[21] Appl. No.: 53,748

[22] Filed: Jul. 2, 1979

[51] Int. Cl.³ ............................................. C05B 7/00
[52] U.S. Cl. .................................... 71/34; 71/41; 71/43; 71/44; 71/51; 71/64 C; 423/313
[58] Field of Search ............... 71/36, 43, 34, 64 C, 71/37, 41, 44, 45, 46, 51; 423/310, 313, 315; 422/129, 230, 231

[56] References Cited

U.S. PATENT DOCUMENTS

| | | | |
|---|---|---|---|
| 2,037,706 | 4/1936 | Curtis | 71/43 X |
| 2,047,394 | 7/1936 | Siems | 71/43 X |
| 2,755,176 | 7/1956 | Pearce et al. | 71/31 |
| 2,904,342 | 9/1959 | Jones et al. | 280/11.16 |
| 2,950,961 | 8/1960 | Striplin et al. | 71/64 C X |
| 3,044,851 | 7/1962 | Young | 23/107 |
| 3,171,733 | 3/1965 | Hignett et al. | 71/48 |
| 3,228,752 | 1/1966 | Hignett et al. | 23/107 |
| 3,264,085 | 8/1966 | Hignett et al. | 71/34 |
| 3,366,127 | 1/1968 | Breitenstein et al. | 133/4 |
| 3,375,063 | 3/1968 | Bookey et al. | 23/107 |
| 3,382,059 | 5/1968 | Getsinger | 71/34 |
| 3,420,624 | 1/1969 | Fitch | 23/107 |
| 3,464,808 | 9/1969 | Kearns | 71/34 |
| 3,562,778 | 2/1971 | Siegel et al. | 71/34 |
| 3,661,551 | 5/1972 | Camp et al. | 71/43 X |
| 3,677,734 | 7/1972 | Carroll et al. | 71/34 |
| 3,733,191 | 5/1973 | Meline et al. | 71/34 |
| 3,922,157 | 11/1975 | Lewis, Jr. et al. | 71/34 |
| 3,939,255 | 2/1976 | Moore et al. | 71/43 X |
| 3,950,495 | 4/1976 | Ries | 71/43 X |
| 3,988,140 | 10/1976 | Burns et al. | 71/64 C X |
| 4,011,300 | 3/1977 | Harbolt et al. | 71/43 X |
| 4,069,034 | 1/1978 | Hoover | 71/33 |
| 4,104,362 | 8/1978 | Hahn et al. | 71/43 X |
| 4,166,840 | 9/1979 | Chapman | 423/313 |

Primary Examiner—Ferris H. Lander
Attorney, Agent, or Firm—Rogers, Eilers & Howell

[57] ABSTRACT

A one vessel process for manufacturing stable ammonium phosphate fertilizer utilizes a spray reactor in which phosphoric acid is reacted with ammonia to form ammonium phosphate. The ammoniation is conducted under conditions which form sufficient ammonium polyphosphate to stabilize the solution in the liquid condition. The liquid may be stored and transported without substantial solidification or crystalization so that the product may be subsequently used as an ammonium phosphate fertilizer.

5 Claims, 1 Drawing Figure

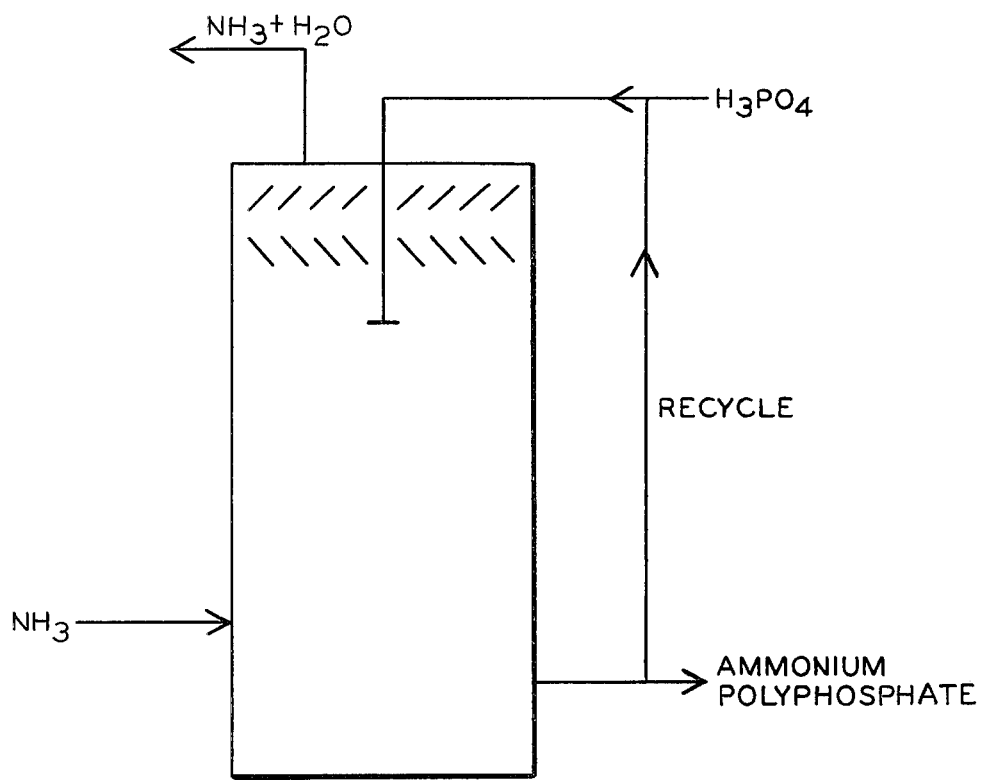

PROCESS OF MANUFACTURING STABLE AMMONIUM POLYPHOSPHATE FERTILIZERS

BACKGROUND AND SUMMARY OF THE INVENTION

Processes of manufacturing ammonium phosphate fertilizer using a variety of techniques are well known in the art and have been described in the following U.S. patents:

| |
|---|
| 2,755,176 |
| 2,904,342 |
| 2,950,961 |
| 3,044,851 |
| 3,171,733 |
| 3,228,752 |
| 3,264,085 |
| 3,366,127 |
| 3,375,063 |
| 3,382,059 |
| 3,420,624 |
| 3,464,808 |
| 3,562,778 |
| 3,677,734 |
| 3,733,191 |
| 3,922,157 |
| 4,104,362 |

The disclosures of the above patents are incorporated by reference herein.

In processes of making ammonium phosphate fertilizer, it is desirable to conduct the reaction under conditions which form a significant amount of ammonium polyphosphate in the reaction product. The polyphosphates are desirable, particularly where merchant grade wet process phosphoric acid is used, due to the sequestering effect that the polyphosphates have on the metal ion impurities which are present in the wet process acid. If the impurities are not sequestered, gelatinous precipitates can form over time in the liquid ammonium phosphate fertilizer, creating difficulties in its use. The gelatinous precipitates can clog pipes in storage and transportation equipment and in the fertilizer applying machinery, which increases the cost of using the liquid fertilizer. In some cases, particularly where the concentration of impurities is high, solidification of the fertilizer may occur.

Applicant has discovered a process of manufacturing ammonium phosphate fertilizer in a single stage reaction vessel which at least partially utilizes the heat of ammoniation to dehydrate the phosphoric acid sufficiently that adequate quantities of polyphosphate are formed in the reaction product. The polyphosphate formed produces a stable liquid ammonium phosphate fertilizer which may be transported and stored at ambient temperatures for substantial lengths of time without significant precipitation or solidification of the product. The liquid fertilizer can be shipped under ambient conditions to remote sites where it can be mixed to form specific blends of fertilizer. The product has high nutrient properties as a fertilizer and the high concentration of nutrients is beneficial from a cost of transportation standpoint.

DESCRIPTION OF THE DRAWING

The drawing is a schematic diagram of applicant's process utilizing a spray reactor.

DESCRIPTION OF THE PREFERRED EMBODIMENTS

Applicant's process contacts phosphoric acid with anhydrous ammonia under conditions in which the phosphoric acid is partially dehydrated and reacted to form an ammonium phosphate containing sufficient ammonium polyphosphates that the reaction product is self-seqesting and stable. The process could use superphosphoric acid, but more typically will use the more dilute wet process merchant grade phosphoric acid. In the process, fine particles of the acid contacts a gaseous stream of anhydrous ammonia so that intimate contact is obtained between the acid and the ammonia. This intimate contact continues for a sufficient time to allow the ammoniation reaction to proceed toward completion. The heat of the ammoniation reaction and the latent heat in the acid and the ammonia feeds, under the conditions of the reaction, flash off water from the acid and results in dehydration and causes formation of ammonium polyphosphates.

A spray reactor, such as shown in schematic in the drawing, provides sufficient time for the reaction to occur. The spray reactor may be a conventional spray vessel constructed of suitable alloys to withstand the conditions of the reaction, for example, stainless steel. Typically the spray reactor in which the reaction would be performed would be a spray vessel approximately 30 inches in diameter and approximately 12 feet tall having a fall from the acid spray nozzle to the anhydrous ammonia inlet of about 8 feet. The ammonium phosphate product normally exits at between about 300° to 400° F.

When a spray reactor is used, the conditions must be such that the particle size of the acid spray assures intimate contact. However, the particle size must be large enough so that the acid falls to the bottom of the reactor and is not unduly entrained in the exhaust gases. It will be appreciated by those skilled in the art that by choosing a feed pressure and nozzle size for the acid spray this can be accomplished. Normally the reactor is operated by introducing gaseous anhydrous ammonia near the bottom of the reactor, but above the exit for the liquid fertilizer, and removing unreacted ammonia and steam at the top of the spray reactor behind entrainment baffles to remove any entrained acid spray, as is known in the art.

The ammonia feed may be further heated by in-line heat exchangers or other conventional equipment to bring it up to the desired temperature for reaction. The heating equipment may include heating coils in the bottom of the spray reactor to use the heat of the effluent ammonium phosphate to heat the anhydrous ammonia feed.

The removed steam and ammonia may be condensed by using the heat therein to heat the anhydrous ammonia which is to be introduced into the reactor. The aqueous ammonia condensate may be subsequently used as blend stock in preparing mixed fertilizers, as is known in the art. The ammonium polyphosphate produced by the reaction may be blended with the condensate.

The phosphoric acid is introduced in a nozzle near the upper portion of the reactor and sprayed downwardly countercurrently against the stream of anhydrous ammonia. If desired the liquid effluent may be recycled to the spray reactor, through additional nozzles, to allow the reaction to proceed further towards completion.

The ammonium phosphate solution is removed from the bottom of the spray reactor. The ammonium phosphate may be used as is or mixed with other materials to form various fertilizer compositions. The ammonium phosphate solutions can conveniently be shipped to remote sites near the intended use and blended to particular fertilizer strengths, for example 10-34-0. Normally the conversion of phosphate to polyphosphate is sufficiently high to provide a stable liquid product, normally in the range of 20% or greater conversion to polyphosphate.

Normally the flow rates are such that residence time of the acid is between about one second to 10 seconds or more. Typically the temperatures of the ammonia feed would be between about 400° F.–600° F. and the temperature of the acid is between ambient up to boiling. Typically the spray reactor is operated under a slight vacuum, though it could be operated under atmospheric or slightly pressurized conditions as well.

The following examples are given to illustrate conditions in the process and conversion of polyphosphate in the production of a stable fertilizer product.

EXAMPLE I

A stable ammonium polyphosphate fertilizer was made in the spray reactor described previously by introducing wet process merchant grade phosphoric acid having a $P_2O_5$ content of 56.63% to the spray vessel. The acid flow rate was about 12 gpm at a pressure of about 45 psi through a standard Tee jet spray nozzle. The acid temperature was about 240° F. Anhydrous ammonia at a temperature of about 475°–500° F. was introduced at the bottom of the spray reactor at a flow rate of about 1–2 gpm. The temperature of the ammonium polyphosphate solution removed at the base of the vessel was about 300° F. The reaction vessel was operated at about 5 inches of water partial vacuum. The ammonium phosphate solution was recycled to the reactor at about 10% of the net product flow. The product had the following analysis:

| | |
|---|---|
| Nitrogen | 1.94% |
| $P_2O_5$ | 56.87% |
| Poly $P_2O_5$ conversion of | 15.63% |
| $P_2O_5$ to Poly $P_2O_5$ | 27.48% |

The product had a nutrient availability (citrate solubility test of) of 100%.

EXAMPLE II

A stable ammonium polyphosphate fertilizer was made in the spray reactor described previously by introducing wet process merchant grade phosphoric acid, having a $P_2O_5$ content of 56.63% to the spray vessel. The acid flow rate was about 12 gpm. at a pressure of about 60 psi through a standard Tee jet spray nozzle. The acid temperature was about 230° F. Anhydrous ammonia at a temperature of about 425° was introduced at the bottom of the spray reactor at a flow rate of about 1–2 gpm. The temperature of the ammonium polyphosphate solution removed at the base of the vessel was about 307° F. The reaction vessel was operated at about 5 inches of water partial vacuum. No recycle was used. The product had the following analysis:

| | |
|---|---|
| Nitrogen | 3.82% |
| $P_2O_5$ | 59.06% |
| Poly $P_2O_5$ | 21.13% |
| Conversion of $P_2O_5$ to Poly $P_2O_5$ | 38.77% |

The product had a nutrient availability (citrate solubility test) of 100%.

EXAMPLE III

A stable ammonium polyphosphate fertilizer was made in the spray reactor described previously by introducing wet process merchant grade phosphoric acid, having a $P_2O_5$ content of 56.63% to the spray vessel. The acid flow rate was about 10.5 gpm. at a pressure of about 30 psi through a standard Tee jet spray nozzle. The acid temperature was about 235° F. Anhydrous ammonia at a temperature of about 435° F. was introduced at the bottom of the spray reactor at a flow rate of about 1–2 gpm. The temperature of the ammonium polyphosphate solution removed at the base of the vessel was about 310° F. The reaction vessel was operated at about 5 inches of water partial vacuum. No recycle was used. The product had the following analysis:

| | |
|---|---|
| Nitrogen | 4.25% |
| $P_2O_5$ | 59.66% |
| Poly $P_2O_5$ | 7.48% |
| Conversion of $P_2O_5$ to Poly $P_2O_5$ | 12.84% |

The product had a nutrient availability (citrate solubility test) of 100%.

EXAMPLE IV

A stable ammonium polyphosphate fertilizer was made in the spray reactor described previously by introducing wet process merchant grade phosphoric acid, having a $P_2O_5$ content of 56.63% to the spray vessel. The acid flow rate was about 12 gpm at a pressure of about 60 psi through a standard Tee jet spray nozzle. The acid temperature was about 245° F. Anhydrous ammonia at a temperature of about 450° F. was introduced at the bottom of the spray reactor at a flow rate of about 1–2 gpm. The temperature of the ammonium polyphosphate solution removed at the base of the vessel was about 315° F. The reaction vessel was operated at about 5 inches of water partial vacuum. The ammonium phosphate solution was recycled to the reactor at about 25% of the net product flow. The product had the following analysis:

| | |
|---|---|
| Nitrogen | 3.47% |
| $P_2O_5$ | 59.31% |
| Poly $P_2O_5$ | 20.07% |
| Conversion of $P_2O_5$ to Poly $P_2O_5$ | 33.84% |

The product had a nutrient availability (citrate solubility test) of 100%.

It can be seen that the conversion of phosphate to polyphosphate in Example III was low. It is believed that this resulted from operating the spray nozzle at too low a pressure so that the acid feed to the spray reactor was not sufficiently atomized to provide intimate contact with the anhydrous ammonia. The pressure, through the spray nozzle was 30 psig. The pressure was adequate in Examples I, II and IV (45-60 psig). Equivalent atomization may be obtained at different rates of operation by varying the pressure and nozzle size. At a given pressure, finer orifice size produces smaller droplets. However, trial and error matching may be required, as will be apparent to those skilled in the art, due to the influence of corrosion, dissolved particles in the feed, and/or scale formation in the equipment.

The samples produced by Examples I, II and IV were liquid at ambient temperatures and remained liquid at 32° F. At the end of 3½ weeks testing, samples I II and IV remained liquid at ambient temperatures. Samples I and IV were tested in a 120° F. oven for 24 hours and remained fluid. This test is normally regarded as being equivalent to one month ambient storage. Samples I, II and IV remained liquid at 32° F. in a 3 week storage test.

While particular embodiments of the invention have been described, it will be appreciated by those skilled in the art that various modifications may be made within the teachings of the invention. It is to be understood that the invention is not to be limited by the illustrations given herein, but only by the scope of the claims appended hereto.

I claim:

1. A process of manufacturing a stable ammonium phosphate fertilizer comprising preheating a feed stream of phosphoric acid, introducing the stream of heated phosphoric acid, at a temperature up to about boiling, to a countercurrent spray reactor having a spray nozzle on the inlet of the phosphoric acid, the spray nozzle being effective to atomize the phosphoric acid and to provide intimate contact between the phosphoric acid and ammonia at the input flow rate of the phosphoric acid; introducing the ammonia to the spray reactor in a preheated countercurrent stream at a temperature of between about 400 and 600 degrees F.; reacting the ammonia and phosphoric acid to form ammonium phosphate, and further heating the phosphoric acid and ammonia to a temperature sufficient to partially dehydrate the phosphoric acid, the phosphoric acid being at least partially dehydrated under the conditions of the spray reactor by the latent heat of the reactants and the heat of the reaction between the phosphoric acid and the ammonia, the spray reactor being operated under a partial vacuum effective to produce a flow through the reactor without entraining substantial phosphoric acid, the phosphoric acid being substantially converted to ammonium phosphate; separating the reactants, the ammonium phosphate product exiting at a temperature between about 300-400 degree F., the heat of the effluent ammonium phosphate being used to at least partially preheat the ammonia feed to the reactor; the resultant ammonium phosphate product containing sufficient ammonium polyphosphate to effectively stabilize the product at ambient temperatures for a time sufficient for storage, transportation and use, and at temperatures as low as 32 degrees F. for up to at least about three weeks and at temperatures as high as 120 degrees F. for up to at least about twenty-four hours; the product having above about 12.84% of the ammonium phosphate present as an ammonium polyphosphate.

2. The process of claim 1 wherein the ammonium phosphate product is recycled in the reactor.

3. The process of claim 1 wherein the liquid ammonium phosphate product has at least about 20% of the ammonium phosphate present as an ammonium polyphosphate.

4. The process of claim 1 wherein the process uses a wet process phosphoric acid feed.

5. A stable liquid dehydrated ammonium phosphate solution produced by the method of claim 1 consisting essentially of ammonium phosphate and ammonium polyphosphate, the product having at least about 12.84% of the ammonium phosphate present as an ammonium polyphosphate, the ammonium polyphosphate being formed from merchant grade phosphoric acid, the ammonium polyphosphate content and the dehydrated state stabilizing the solution against precipitation of impurities contained in the merchant grade phosphoric acid and present in the product, the product having high nutrient availability properties as a fertilizer and being readily transportable.

* * * * *